(12) United States Patent
Dullaert et al.

(10) Patent No.: US 9,470,366 B2
(45) Date of Patent: Oct. 18, 2016

(54) LINER FOR GAS STORAGE TANK

(75) Inventors: Konraad Dullaert, Echt (NL);
Katarina Tomic, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 658 days.

(21) Appl. No.: 13/991,501

(22) PCT Filed: Dec. 9, 2011

(86) PCT No.: PCT/EP2011/072282
§ 371 (c)(1),
(2), (4) Date: Oct. 18, 2013

(87) PCT Pub. No.: WO2012/076677
PCT Pub. Date: Jun. 14, 2012

(65) Prior Publication Data
US 2014/0034654 A1   Feb. 6, 2014

(30) Foreign Application Priority Data

Dec. 9, 2010 (EP) .................................... 10194315

(51) Int. Cl.
*F17C 1/16* (2006.01)
*C08K 3/34* (2006.01)
*C08L 77/02* (2006.01)
*C08L 77/06* (2006.01)
*B29D 22/00* (2006.01)

(52) U.S. Cl.
CPC ............... *F17C 1/16* (2013.01); *B29D 22/003* (2013.01); *C08K 3/346* (2013.01); *C08L 77/02* (2013.01); *C08L 77/06* (2013.01); *C08L 2205/02* (2013.01); *F17C 2203/032* (2013.01); *F17C 2203/0391* (2013.01); *F17C 2203/0604* (2013.01); *F17C 2203/066* (2013.01); *F17C 2203/0663* (2013.01); *F17C 2203/0675* (2013.01); *F17C 2209/2127* (2013.01); *F17C 2221/011* (2013.01); *F17C 2221/012* (2013.01); *F17C 2221/014* (2013.01); *F17C 2221/017* (2013.01); *F17C 2221/033* (2013.01); *F17C 2221/035* (2013.01); *F17C 2260/036* (2013.01); *F17C 2270/0144* (2013.01); *Y02E 60/321* (2013.01)

(58) Field of Classification Search
CPC ................ F17C 1/16; F17C 2203/032; F17C 2203/0391; F17C 2203/0604; F17C 2203/066; F17C 2203/0663; F17C 2203/0675; F17C 2209/2127; F17C 2221/011; F17C 2221/012; F17C 2221/014; F17C 2221/017; F17C 2221/033; F17C 2221/035; F17C 2260/036; F17C 2270/0144; C08K 3/346; B29D 22/003; C08L 77/02; C08L 77/06; C08L 2205/02; C08L 51/06
See application file for complete search history.

(56) References Cited

U.S. PATENT DOCUMENTS

| 2002/0007021 | A1† | 1/2002 | Brink |
| 2007/0246475 | A1 | 10/2007 | Mazabraud et al. |
| 2008/0293887 | A1 | 11/2008 | Sato |
| 2009/0203845 | A1† | 8/2009 | Fukui |

FOREIGN PATENT DOCUMENTS

| CN | 101309971 A | 11/2008 |
| EP | 2 457 952 | 5/2012 |
| JP | 2005-272535 | 10/2005 |
| JP | 2009-1782 | 1/2009 |
| WO | WO 98/24846 | 6/1998 |
| WO | 2009/119759 A1† | 10/2009 |

OTHER PUBLICATIONS

International Search Report for PCT/EP2011/072282, mailed Jul. 6, 2012.
Written Opinion of the International Searching Authority for PCT/EP2011/072282, mailed Jul. 6, 2012.

† cited by third party

*Primary Examiner* — Michael C Miggins
(74) *Attorney, Agent, or Firm* — Nixon & Vanderhye P.C.

(57) ABSTRACT

This invention relates to a liner for a gas storage tank containing a polymer composition comprising: i. a polyamide A, and ii. a nucleating agent in an amount of at least 0.001 weight percent with respect to the total amount of the polymer composition, and iii. an impact modifier in an amount of at least 1 weight percent with respect to the total amount of the polymer composition. The invention also relates to a gas storage tank comprising a structural fiber composite comprising continuous carbon or glass fibers, as well as a method for preparing a liner by blow molding.

12 Claims, No Drawings

LINER FOR GAS STORAGE TANK

This application is the U.S. national phase of International Application No. PCT/EP2011/072282, filed 9 Dec. 2011, which designated the U.S. and claims priority to EP Application No. 10194315.7, filed 9 Dec. 2010, the entire contents of each of which are hereby incorporated by reference.

This invention relates to a liner for a gas storage tank containing a polymer composition and a gas storage tank comprising this liner.

PRIOR ART

Gas storage tanks are known and for example referred to as composite overwrapped pressure vessel or vacuum insulated tank vessels. A gas storage tank comprises a thin, non-structural liner usually wrapped with a structural fiber composite, designed to hold a fluid or gas under pressure. The liner intends to provide a barrier between the fluid or gas and the composite, preventing amongst others leaks and chemical degradation of the structural fiber composite. In general, a protective shell is applied for protective shielding against impact damage. The most commonly used composites are fiber reinforced polymers. For liners, most commonly polyethylene is used, as is for example described in US 2002088806. These types of tanks have the advantage over similar sized metallic pressure tanks in that they are lower in weight. A disadvantage of the liner is however, that gas which permeates through the liner may brittle the fibers. A liner with improved barrier properties is described in US20090203845, which comprises a polyamide resin, a copolyamide and an impact-resistant material. A disadvantage of this liner is that the barrier properties are still insufficient.

OBJECT OF PRESENT INVENTION

It is an object of the present invention to provide a liner for gas storage tanks which exhibit improved barrier properties.

Present Invention

It now has surprisingly been found that a liner for gas storage tank containing a polymer composition comprising:
i. a polyamide A, and
ii. a nucleating agent in an amount of at least 0.001 weight percent with respect to the total amount of the polymer composition, and
iii. an impact modifier in an amount of at least 1 weight percent with respect to the total amount of the polymer composition, shows improved barrier properties. The liner according to the invention has improved barrier properties. This liner results in less degradation of the fibers and allows for thinner liners or less layers in a gas storage tank than known in the prior art, which results in saving materials and easier process. An additional advantage is that less buckling is observed with the liner according to the invention. Buckling occurs when gas, which is present due to permeation between the liner and another layer, inflates when the pressure in the tank is low, for example upon opening of the tank.

Another advantage of liner of the present invention is that an optional present vacuum space, present for superinsulation, is also better protected against permeation of gas.

The term "gas" is here understood as comprising various gasses, which may however comprise a liquid part upon storage. Examples of gasses include biogases, and natural gases. Specific examples include hydrogen, methane, butane, propane, helium, nitrogen and oxygen.

A liner can be present at the inner side of a tank, thus in contact with the liquid and/or gas to be stored. When a vacuum space is present, a liner can also be present at the outer side of a tank, thus between the vacuum space and the outside of a tank. A tank can also contain a combination of liners, for example one at the inner side and one at the outer side.

Another advantage of the liner according to the invention is that it combines good barrier properties with enough stiffness. Surprisingly, it has been found that the presence of a nucleating agent hardly influenced the blow molding properties during preparation of the liner.

Polyamide A

The polyamide A in the liner containing a polymer composition, can be any semi-crystalline polyamide or blends thereof, as well as copolyamides.

"Semi-crystalline polyamide" is here understood to encompass polyamides having crystalline and amorphous regions. Suitable polyamides include aliphatic polyamides such as PA6, PA66, PA46, PA410, PA610, PA11, PA12, PA412 as well as blends thereof, but also semi-aromatic polyamides. Suitable semi-aromatic polyamides include terephthalic acid based polyamides like PA6T, PA9T, PA4T and PA6T6I, PA1OT as well as PAMXD6 and PAMXDT, and copolyamides thereof, as well as blends thereof, as well as blends of aliphatic and semi-aromatic polyamides.

Preferably, polyamide A is chosen from the group of PA6, PA66 and blends thereof, as this has the advantage that these polyamides are readily available and have good permeation level coupled with good level of ductility or resistance to impact.

Nucleating Agent

The liner according to the invention comprises a nucleating agent in an amount of at least 0.001 weight percent with respect to the total amount of the polymer composition.

The term "nucleating agent" is known to a person skilled in the art and refers to a substance which when incorporated in a polymer forms nuclei for the growth of crystals in the polymer melt. Nucleating agents include for example polyamides having a higher melting temperature than the melting temperature of polyamide A. A higher melting temperature is here understood to be preferably a melting temperature at least 10° C. higher than the melting temperature of polyamide A, more preferably at least 20° C. higher than the melting temperature of polyamide A and most preferred at least 50° C. higher than the melting temperature of polyamide A The polyamides suitable as a nucleating agent include all polyamides mentioned above with the proviso that the melting temperature is higher than the melting temperature of polyamide A. Preferably PA46, PA4T or PA410 is used as a nucleating agent.

Preferably the nucleating agent is present in an amount of at least 0.01 wt %, more preferably at least 0.02 wt % and most preferred at least 0.05 wt % with respect to the total amount of the polymer composition.

Further nucleating agents include micro talcum, carbon black, silica, titane dioxide, and nano-clay.

Preferably the nucleating agent is present in an amount of at most 5 wt %, more preferably at most 4 wt % and even more preferably at most 3 wt % and most preferred at most 0.15 wt % with respect to the total amount of the polymer composition.

Preferably, the nucleating agent is micro talcum. This micro talcum preferably has a median diameter of less than 1 micrometer, more preferably less than 0.7 micrometer, even more preferred less than 0.6 micrometer.

This has the advantage that the micro talcum is more effective in improving barrier properties than talcum particles with a higher median diameter.

Micro talcum may be present in the polymer composition in very low amounts, such as in an amount of at least 0.001 wt % with respect to the total amount of the polymer composition, preferably at least 0.01 wt %, more preferably at least 0.02 wt %, even more preferably at least 0.04 wt %. Preferably, micro talcum may be present in the polymer composition in an amount of at most 0.8 wt % with respect to the total amount of the polymer composition, more preferably at most 0.5 wt % and even more preferred at most 0.2 wt %.

Amounts of micro talcum according to the invention have the advantage that the cold impact at −30° C. remains sufficient.

In one embodiment, PA6 is chosen as polyamide A, together with a nucleating agent chosen from the group of PA66, PA46, PA410 and PA4T.

In another embodiment, PA66 is chosen as polyamide A, together with a nucleating agent chosen from the group of PA46 and PA4T.

Impact Modifier

The liner according to the invention comprises an impact modifier in an amount of at least 1 wt % with respect to the total amount of the polymer composition. Impact modifiers as such are known, and are rubber-like polymers that not only contain apolar monomers such as olefins, but also polar or reactive monomers such as, among others, acrylates and epoxide, acid or anhydride containing monomers. Examples include a copolymer of ethylene with (meth)acrylic acid or an ethylene/propylene copolymer functionalized with anhydride groups. The advantage of impact modifiers is that they do not only improve the impact strength of the polymer composition but also contribute to an increase in viscosity.

Preferably the amount of impact modifiers is at least 5 wt %, more preferably at least 7 wt %, and even more preferably at least 10 wt %. This has the advantage that the impact strength is good.

Preferably, the amount of impact modifiers is at most 60 wt % with respect to the total amount of the polymer composition, more preferably at most 50 wt % and even more preferred at most 30 wt %. Most advantageous is an amount of impact modifier between 7 and 20 wt %. This has the advantage that the barrier properties remain sufficient in combination with good stiffness performance. Preferably, the impact modifier is a core-shell type impact modifier. It has been shown that core-shell impact modifiers influence barrier properties less.

Other Additives

The liner according to the invention can optionally comprise other additives such as fillers, colorants, branching agents, release agents and lubricants.

Suitable fillers are mineral fillers such as clay, mica, talc, glass spheres. Reinforcing fibres are for example glass fibres or carbon fibers. As reinforcing fibres the polyamide composition preferably comprises 1 to 60 wt % glass fibres, relative to the total amount of the polymer composition, more preferably 10 to 45 wt %, and most preferably 10 to 20 wt % glass fibres. Suitable glass fibres generally have a diameter of 5-20 micron, preferably 8-15 micron, and are provided with a coating suitable for use in polyamide. An advantage of a polymer composition comprising glass fibres is its increased strength and stiffness, particularly also at higher temperatures, which allows use at temperatures up to close to the melting point of the polymer in a polymer composition. Carbon fibers may be present in amount of at most 30 wt % with respect to the total polymer composition.

Preparation of Liner

A liner may be prepared by blow molding or injection molding. Injection molding is preferably performed in the form of two-shell molding after which the shells are welded into a liner. When prepared by blow molding, the liner preferably also comprises a branching agent to allow higher viscosities for the polymer composition.

Blow-molding is here understood to comprise at least the following steps:
a. heating the polymer composition to obtain a homogeneous viscous liquid;
b. forming a parison from the viscous liquid;
c. expand the parison by pressurized gas and press it against a mold cavity until it cools and solidifies to form a part;
d. opening the mold;
e. ejecting the part.

The preferred method for preparing a liner is blow-molding, as this allows for larger liners, and avoids the use of an additional welding process step.

Gas Storage Tank

The invention also relates to a gas storage tank comprising a structural fiber composite and the liner according to the invention. The structural fiber composite usually comprises continuous carbon or glass fibers.

EXAMPLES

Materials Used:
Comparative example A and B: HDPE

Example 1

89.67 wt % PA6 with a relative viscosity of 2.5,
0.5 wt % branching agent,
9.75 wt % impact modifier (maleic anhydride (MAH) grafted ethene copolymer),
0.08 wt % micro talcum as nucleating agent.

Example 2

79.82 wt % PA6 with relative viscosity 2.2,
20 wt % impact modifier (maleic anhydride (MAH) grafted ethene copolymer),
0.08 wt % micro talcum as nucleating agent.

Micro Talcum

Median diameter of 0.50 micrometer, 99% was less than 5 micrometer, 92% less than 2 micrometer and 75% less than 1 micrometer.

Testing Method for Measurement of Helium Permeability

Test method covers the estimation of the steady-state rate of transmission of a gas through a plastic (film, sheet). The sample is mounted to form a barrier between two chambers of a gas transmission cell. One chamber contains the test gas at specified high pressure and in the other chamber permeating gas has been collected and brought to a detector. Knowing the surface of a sample, gas transmission rate can be calculated as the quantity of a given gas passing through a unit surface of a plastic film in unit time under the test conditions.

Testing of helium permeation has been performed at temperatures of 40° C. and 25° C., both at 0% relative humidity. All tested samples had thickness of 0.4 mm and partial pressure of helium gas was 6 Bar. Helium permeability is calculated as a ratio of gas transmission rate and helium partial pressure multiplied by film thickness. The unit for expressing permeability is $cm^3$ $mm/m^2$ day atm.

TABLE 1

Helium permeability results

| | Main Material* | Nucleating agent | Permeation [$cm^3$ $mm/m^2$ day atm] 40° C. | Permeation [$cm^3$ $mm/m^2$ day atm] 25° C. |
|---|---|---|---|---|
| Comparative example A | HDPE | — | 429 | n.m. |
| Comparative example B | HDPE | — | 427 | 311 |
| Example 1 | PA6 + IM | micro talcum | 161 | 89 |
| Example 2 | PA6 + IM | micro talcum | 131 | 123 |

*For exact composition see above under "Materials used";
n.m. is not measured.

The results in Table 1 clearly show that the polymer composition as employed for a liner according to the invention shows a decreased permeability with respect to HDPE.

Permeability was also measured for nitrogen gas by the same procedure as described for Helium at 40° C. Permeability was further measured for methane by the method as described in ISO 15105-1 at 40° C. For the polymer composition as employed for a liner according to the invention, the permeability for both nitrogen and methane at 40° C. was less than 1 $cm^3$ $mm/m^2$ day atm. Whereas for HDPE, as comparison, the permeation for nitrogen was 124 $cm^3$ $mm/m^2$ day atm and for methane 341 $cm^3$ $mm/m^2$ day atm. These results also indicate that a liner according to the invention, exhibits excellent barrier properties as compared to HDPE liners.

Melt strength was measured using a capillary Rheometer (Göttfert Rheograph 6000). During the test a strand of the polymer composition was extruded using a constant throughput. (Data: Oven diameter 12 mm, Vpiston=0.1 mm/sec, capillary 40/2, capillary length 40 mm, Tmelt=240° C.) During the melt strength measurement the strand was elongated at a constant acceleration (1.2 mm/sec2). At different draw ratios the melt strength (cN) was determined.

Surprisingly, it was found that the value for the polymer composition for the liner according to the invention was around 15 cN, which was comparable to a polymer composition not containing a nucleating agent.

The invention claimed is:

1. A liner for a gas storage tank, the liner containing a polymer composition comprising:
   i. a polyamide A,
   ii. a nucleating agent in an amount of at least 0.001 wt % and at most 3 wt % with respect to the total amount of the polymer composition, and
   iii. an impact modifier in an amount of at least 1 weight percent with respect to the total amount of the polymer composition.

2. The liner according to claim 1, wherein the polyamide A is polyamide-6 (PA6), and wherein the nucleating agent is selected from the group consisting of polyamide-66 (PA66), polyamide-46 (PA46), polyamide-410 (PA410) and polyamide-4T (PA4T).

3. The liner according to claim 1, wherein the polyamide A is polyamide-66 (PA66), and wherein the nucleating agent is selected from the group consisting of polyamide-46 (PA46) and polyamide-4T (PA4T).

4. The liner according to claim 1, wherein the nucleating agent is micro talcum.

5. The liner according to claim 1, wherein the nucleating agent is present in an amount of at least 0.05 wt % with respect to the total amount of polymer composition.

6. The liner according to claim 1, wherein the nucleating agent is present in an amount between 0.05 wt % to 0.15 wt % with respect to the total amount of polymer composition.

7. The liner according claim 1, wherein the amount of impact modifier is between 7 wt % and 20 wt % with respect to the total amount of polymer composition.

8. The liner according to claim 1, wherein the impact modifier is a core-shell type impact modifier.

9. A gas storage tank comprising the liner of claim 1 and a structural fiber composite comprising continuous carbon or glass fibers.

10. The liner according to claim 1, wherein the nucleating agent is selected from the group consisting of polyamides having a higher melting temperature than polyamide A and micro talcum.

11. The liner according to claim 10, wherein the polyamides having a higher melting temperature than polyamide A are selected from the group consisting of polyamide-46 (PA46), polyamide-410 (PA410) and polyamide-4T (PA4T).

12. A method for preparing the liner according to claim 1, comprising at least the following steps:
   a. heating the polymer composition to obtain a homogeneous viscous liquid;
   b. forming a parison from the viscous liquid;
   c. expanding the parison by pressurized gas and pressing the expanded parison against a mold cavity until the parison cools and solidifies to form a part;
   d. opening the mold; and
   e. ejecting the part.

* * * * *